W. C. KING.
Jelly-Jars.

No. 138,502. Patented May 6, 1873.

Attest:

Inventor:
William C. King
By Johnston & Grindlay
his Attorneys

UNITED STATES PATENT OFFICE.

WILLIAM C. KING, OF PITTSBURG, PENNSYLVANIA.

IMPROVEMENT IN JELLY-JARS.

Specification forming part of Letters Patent No. 138,502, dated May 6, 1873; application filed March 5, 1873.

*To all whom it may concern:*

Be it known that I, WILLIAM C. KING, of Pittsburg, in the county of Allegheny and State of Pennsylvania, have invented a certain new and useful Improvement in Jelly-Glass; and I do hereby declare that the following is a full, clear, and exact description thereof, reference being had to the accompanying drawing and to the letters of reference marked thereon.

My invention relates to an improvement in jelly-glasses, and consists, first, in providing the glass with a recess or groove in its outer wall, near its upper edge or mouth; and, second, in providing the glass with a pressed-glass cover; and, third, in the combination of the glass A, elastic ring, and cover.

To enable others skilled in the art to make and use my invention, I will proceed to describe more fully its construction and operation.

Figure 1:
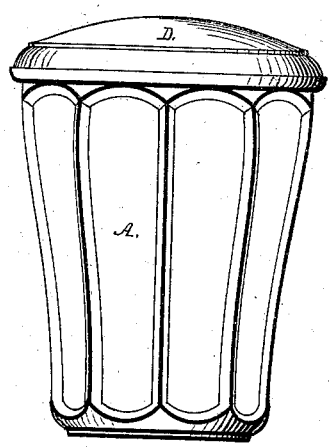
Figure 2:
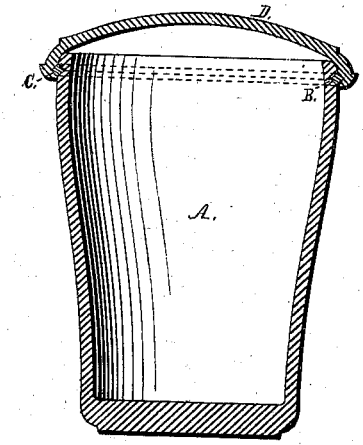

In the accompanying drawing which forms part of my specification, Figure 1 is a side elevation of my improvement in jelly-glass. Fig. 2 is a vertical section of the same.

A represents the jelly-glass in the outer wall. Near its upper edge or mouth is a V-shaped groove, B, in which is placed a lozenge-shaped (when viewed in cross-section) elastic ring, C. The lid D is constructed of glass by the pressing process, well understood by manufacturers of glassware. The lid, ring, and glass are so constructed and arranged with relation to each other that dust and other impurities are excluded from the contents of the jelly-glass, and, at the same time, allowing the lid D to be removed and replaced with facility.

I am aware that gum rings have been used in combination with the lid of a fruit-jar for hermetically sealing it; but my improvement, in contradistinction to such device, consists in so constructing a jelly-glass as to exclude dust, &c., from the contents of the glass without hermetically sealing—the advantage of which consists in enabling the housewife to close up the jelly-glass for the purpose of preserving the jelly placed in it, and, also, to remove the cover when desired with ease.

Having thus described the nature, construction, and operation of my improvement, what I claim as of my invention, is—

1. A new article of manufacture—viz., the jelly-glass A, provided with a V-shaped groove near its upper edge, substantially as herein described and for the purpose set forth.

2. The jelly-glass A in combination with the lozenge-shaped ring C (when viewed in cross-section) and the lid D, substantially as herein described and for the purpose set forth.

WM. C. KING.

Witnesses:
A. B. HAY,
JAMES J. JOHNSTON.